United States Patent [19]

Kaufmann et al.

[11] Patent Number: 4,626,372

[45] Date of Patent: Dec. 2, 1986

[54] BORATE SOLUTION SOLUBLE POLYVINYL ALCOHOL FILMS

[75] Inventors: Edward J. Kaufmann, San Ramon; Barry A. Sudbury, Pleasanton, both of Calif.

[73] Assignee: The Clorox Company, Oakland, Calif.

[21] Appl. No.: 577,727

[22] Filed: Feb. 8, 1984

Related U.S. Application Data

[63] Continuation-in-part of Ser. No. 319,966, Nov. 10, 1981, abandoned.

[51] Int. Cl.$^4$ ............................................. C11D 17/04
[52] U.S. Cl. .................. 252/90; 206/524.7; 252/174.23; 252/363.5
[58] Field of Search ............... 252/90, 92, 93, 363.5, 252/174.23; 206/484; 525/56, 57, 61; 524/58, 321, 388

[56] References Cited

U.S. PATENT DOCUMENTS

| | | | |
|---|---|---|---|
| 2,804,395 | 8/1957 | Boyajian | 524/58 X |
| 3,113,674 | 10/1963 | Kiefer et al. | 206/0.84 |
| 3,148,166 | 9/1964 | Suzumura et al. | 524/321 X |
| 3,198,740 | 8/1965 | Dunlop et al. | 252/90 |
| 3,220,991 | 11/1965 | Martins | 524/321 X |
| 3,240,712 | 3/1966 | Schulerud et al. | 252/93 X |
| 3,300,546 | 1/1967 | Baechtold | 260/876 |
| 3,366,592 | 1/1968 | Beeman | 524/388 |
| 3,374,195 | 3/1968 | Bianco et al. | 26/29.6 |
| 3,413,229 | 11/1968 | Bianco et al. | 252/90 |
| 3,528,921 | 9/1970 | Gray | 252/99 |
| 3,632,786 | 1/1972 | Nickerson | 524/503 |
| 3,892,905 | 7/1975 | Albert | 428/220 |
| 4,115,292 | 9/1978 | Richardson et al. | 252/90 |
| 4,140,688 | 2/1979 | Sumi et al. | 524/388 |
| 4,289,815 | 9/1981 | Lee | 428/35 |
| 4,323,492 | 4/1982 | Zimmermann et al. | 524/388 |

FOREIGN PATENT DOCUMENTS

87542 7/1976 Japan.

Primary Examiner—Prince E. Willis
Attorney, Agent, or Firm—John L. White; Joel J. Hayashida; Stephen M. Westbrook

[57] ABSTRACT

Conventional polyvinyl alcohol envelopes will not readily dissolve in wash water which has a significant borate concentration and a pH frequently encountered in wash liquors. Herein, such films are rendered sufficiently soluble in such solutions. In the preferred embodiment this is done by utilizing a polyvinyl alcohol film wherein at least a portion of the polyvinyl alcohol has a number average molecular weight below about 50,000, or a polyvinyl alcohol film containing a polyhydroxy compound having a binding constant with borate of at least about 800M$^{-2}$, or utilizing a polyvinyl alcohol film having an acid having an acid dissociation constant of $10^{-9}$M or larger; or a polyvinyl alcohol film containing mixtures thereof.

6 Claims, No Drawings

BORATE SOLUTION SOLUBLE POLYVINYL ALCOHOL FILMS

This is a continuation-in-part application of co-pending U.S. application Ser. No. 319,966, filed Nov. 10, 1981, now abandoned.

TECHNICAL FIELD

The invention relates to polyvinyl alcohol films which are soluble in borate containing solutions and more particularly to such films in the form of envelopes containing laundry additives such as detergents and the like.

BACKGROUND ART

Several film materials are available which are water soluble and which can be formed into envelopes in which premeasured amounts of laundry additives can be sealed. Methyl cellulose, polyethylene oxide and polyvinyl alcohol are particularly useful film materials of this nature. Methyl cellulose films generally do not have sufficient solubility at higher water temperatures. Polyethylene oxide films tend to absorb moisture too readily and become tacky.

Polyvinyl alcohol films do not have the problems of methyl cellulose or polyethylene oxide films. However, when these films are placed in solutions containing borate at levels and pHs frequently encountered in laundry applications, the rate of solubility of such films is severely reduced. Yet, borate is often present in clothes washing liquors and the like, since one of the most widely used bleaching compositions is principally sodium perborate, which forms borate ions in solution. Other borate sources such as borax, are also often used as laundry additives.

DISCLOSURE OF INVENTION

The present invention is directed to overcoming the problem of slow dissolution rates of polyvinyl alcohol films in borate containing solutions as set forth above.

In accordance with an embodiment of the present invention, a polyvinyl alcohol film is provided which is readily soluble in borate containing solutions. The film comprises a composition selected from the group consisting of polyvinyl alcohol film containing a polyhydroxy compound (PHC) that reacts with borate in aqueous solution to form a borate-PHC Complex with a binding constant, $K_2$ being defined as equal to

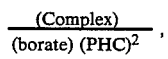

$$\frac{(Complex)}{(borate)(PHC)^2},$$

that is greater than about $800M^{-2}$ at 25° C.; and a polyvinyl alcohol film containing an acid having an acid dissociation constant, in water at 25° C., greater than about $10^{-9}M$, the composition being selected such that 50% or more, by volume, of a 1.5 cm×1.5 cm×0.0038 cm piece of said film, when agitated in a volume of 750 cc of a solution having a borate concentration of about $1.7\times10^{-3}M$ and having a pH of about 10.7 in a cylindrical container 9.5 cm in diameter using an oblong magnetic stirring bar about 1 cm×5 cm at a speed sufficient to cause a vortex to extend about 20% of the way downwardly from a top surface of the solution, substantially dissolves or disperses, as determined by visual evaluation, in 300 seconds at 37.5° C.

In accordance with another embodiment of the present invention a laundry additive combination is provided. The laundry additive combination includes the laundry additive and a sealed envelope containing that additive. The envelope is formed of a polyvinyl alcohol film, which film incorporates means for solubilizing the envelope sufficiently so that a piece of the film will dissolve when tested as previously set forth.

The present invention thus solves the problem of providing polyvinyl alcohol films which will rapidly dissolve in solutions which contain borate at levels and pHs normally encountered in laundry applications.

BEST MODE FOR CARRYING OUT THE INVENTION

When the term polyvinyl alcohol is used herein this term is meant to include the polyvinyl alcohol itself, derivatives thereof, and its water soluble copolymers. The polyvinyl alcohol resins described herein are generally produced by the hydrolysis of polyvinyl acetate and generally have a degree of hydrolysis between about 70% and about 98%.

It is well known that envelopes made of polyvinyl alcohol films can be used to enclose premeasured amounts of laundry additives such as detergents, bleaches, brighteners, builders, fabric softeners, and the like. Such polyvinyl alcohol films are generally formed from polyvinyl alcohol resins of a desired degree of hydrolysis. In practice, the polyvinyl alcohol is dissolved in water, with heating, and one or another conventional plasticizers, such as, for example, polyethylene glycol having a molecular weight of 200 to 600, release agents, and an anti-blocking agent, if desired, are also dissolved in the same solution. Thereafter, the solution is simply cast and the water evaporated to produce a film with the desired physical properties.

The conventional polyvinyl alcohol films of the prior art have very adequate solubility in water. However, when there is a significant borate concentration in the water and when the pH is that frequently encountered in washing liquors, such polyvinyl alcohol films will not dissolve sufficiently readily to deliver a laundry additive to the solution early in the wash cycle.

An objective test, which simulates results found for top loading automatic washing machines, has been developed for determining when a polyvinyl alcohol film will have sufficient solubility in borate containing solutions so as to be readily soluble under normal laundry conditions. Acceptable solubility rate is demonstrated when at least 50% by volume of a 1.5 cm×1.5 cm×0.0038 cm sample of the film substantially dissolves or disperses within 300 seconds, as determined by visual evaluation, in a mildly agitated aqueous solution having a borate concentration of $1.7\times10^{-3}M$ and having a pH of about 10.7 at a temperature of 37.5° C. Mild agitation is defined, for the purposes of the test, as agitation in a volume of 750 cc of the solution in a cylindrical container 9.5 cm in diameter using an oblong magnetic stirring rod about 1 cm×5 cm at a speed sufficient to cause a vortex to extend about 20% of the way downwardly from the surface of the solution.

It has been discovered that when the film is any one of three compositions, or any mixture of such compositions in sufficient quantities, a film results which satisfies the above-set-out test and is acceptable for laundry use.

The first composition which satisfies the test is a polyvinyl alcohol film produced from polyvinyl alcohol resins characterized by having a number average molecular weight below about 50,000, more preferably below about 25,000, and still more preferably of about 10,000. When this first composition is utilized without any of the second or third compositions set out below, at least about 50% of the polyvinyl alcohol resin on which the film is based must consist of a polyvinyl alcohol of such an average molecular weight. Somewhat unexpectedly, such low molecular weight polyvinyl alcohol resins produce films of sufficient strength, stability in humid weather, and integrity for storage and laundry use.

A second composition which will satisfy the above test, either by itself or in combination with the first constituent or the third constituent which will be set out below, or with both the first and third constituents, is a polyvinyl alcohol film which contains a polyhydroxy compound (PHC) which reacts with borate in aqueous solution to form a borate-PHC Complex with a binding constant ($K_2$) as defined by the equation $$K_2 = \frac{(Complex)}{(borate)(PHC)^2},$$

that is greater than about 800 $M^{-2}$ at 25° C.; the constituents concentrations being in moles per liter. Particularly useful polyhydroxy compounds are levulose (fructose), mannitol, catechol, sorbitol, sorbose, pentaerythritol and meso-erythritol. In general, the higher the binding constant, the more effective the polyhydroxy compound in providing the desired solubility characteristics. The term "borate-PHC Complex," is generally understood by practitioners of reasonable skill in the art to denote complexation compounds formed between a borate ion species and a polyhydroxy or polyol compound. This phenomenon is well known and amply depicted in the literature. It is somewhat surprising that significant quantities of the polyhydroxy compound can be incorporated into the polyvinyl alcohol without rendering envelopes made from the film unfit for long term storage and laundry use.

If the polyhydroxy compound is utilized by itself to solubilize the polyvinyl alcohol film, it is preferably present in an amount of at least about 10%, by weight, of the polyvinyl alcohol film, the effective amount depending on the identity of the polyhydroxy compound. On the other hand, lesser amounts of the polyhydroxy compound can be utilized if the film includes a polyvinyl alcohol having a relatively lower molecular weight, for example, a number average molecular weight below about 50,000, or if the film includes an acid as will be set out below.

A third polyvinyl alcohol film having the desired characteristics is one which contains an organic, inorganic or polymeric acid having an acid dissociation constant, in water at 25° C., greater than about $10^{-9}M$ and preferably greater than about $10^{-6}M$. Polyacrylic acids with average molecular weights in the range from about 3000 to about 150,000 are very useful acids for such purposes. Other acids are also useful, for example, citric acid, succinic acid, tartaric acid, potassium hydrogen phthalate, sodium dihydrogen phosphate, adipic acid, cysteine, glutamic acid, benzoic acid and oxalic acid. It should be noted that when the acid is utilized by itself, it is preferred that it be in a concentration of at least about 10%, by weight, based on the weight of the polyvinyl alcohol film. The amount of acid can be reduced if some polyhydroxy compound, as set out above, is present and/or if the film includes polyvinyl alcohol having a number average molecular weight below about 50,000 and more preferably below about 25,000.

It is essential, in any case, that the polyvinyl alcohol film, in accordance with the present invention, be capable of satisfying the objective test of solubility in a borate containing solution and at a pH as set out above.

Thus, either a polyhydroxy compound as set out above or an acid as set out above, both limited to the characteristics set out above, serve to solubilize the envelope in an aqueous solution having a borate concentration of about $1.7 \times 10^{-3}M$ and having a pH of about 10.7 to an extent such that 50% or more, by volume about 1.5 cm $\times$ 1.5 cm $\times$ 0.0038 cm piece of said film, when agitated in a volume of 750 cc of said solution, in a cylindrical container 9.5 cm in diameter, using an oblong magnetic stirring bar 1 cm $\times$ 5 cm at a speed sufficient to cause a vortex to extend about 20% of the way downwardly from a top surface of the solution, dissolves or disperses in 300 seconds at 37.5° C.

When envelopes are made from the films, such films will generally be about 1.5 mils thick. This provides an envelope of sufficient strength which will dissolve sufficiently quickly in normal laundry use. However, film thicknesses of from about 1.0 to about 3.5 mils are practical for the application described herein.

It should be noted that not only may detergents be enclosed in envelopes in accordance with the present invention, but also builders, bleaches, brighteners, fabric softeners, anti-soiling polymers and other laundry additives may be so enclosed, provided they do not dissolve or otherwise interact deleteriously with the film material.

The invention will be better understood by reference to the following examples:

EXAMPLES 1-5

20.1 g of polyvinyl alcohol (number average molecular weight≃10,000, 88% hydrolyzed) was added slowly with mixing to 8.6 g of polyethylene glycol (average molecular weight≃200) and 86.4 g of distilled water. After the polyvinyl alcohol was dispersed, the dispersion was heated for approximately two hours at 60° C. to completely dissolve the polyvinyl alcohol. The solution was cooled to 23° C., stirred slowly to remove air bubbles and cast on a glass plate using a film applicator with an 0.051 cm clearance.

The resulting film was dried at room temperature for 1-2 hours, dried further at 37.5° C. for 2 hours and allowed to equilibrate to room temperature conditions (≃23° C., 50% relative humidity) before being removed from the glass plate for testing. This procedure yielded a film 0.0038 cm thick containing approximately 66% polyvinyl alcohol, 28% polyethylene glycol and 6% water. Using the evaluation procedure as set out above, >95% of the film dissolved in 150 seconds. In this procedure borax was added as the source of borate and sodium carbonate and sodium bicarbonate were used to maintain the pH at 10.7. Using a similar procedure, additional films 0.0038 cm in thickness with different number average molecular weight polyvinyl alcohol resins were prepared and evaluated and the results are summarized in Table I.

These examples demonstrated that a polyvinyl alcohol resin of a number average molecular weight of about 50,000 or less is necessary to provide a film that meets desired solubility criteria in the absence of any polyhydroxy compound or acid. The 60% dissolved/dispersed result at 300 second for 50,000 molecular weight polyvinyl alcohol is somewhat low but is quite sufficient for normal laundry use.

EXAMPLES 6-15

12.9 g of polyvinyl alcohol (average molecular weight≃96,000, 88% hydrolyzed) was added slowly with mixing to 0.4 g of polyethylene glycol (average molecular weight≃200) and 81.6 g of distilled water.

TABLE I

| | Polyvinyl Alcohol | | % film dissolved/dispersed | | |
|---|---|---|---|---|---|
| Example | Number Average MW | % Hydrolysis | 30 sec. | 150 sec. | 300 sec. |
| 1 | 10,000 | 88 | 95 | >95 | >95 |
| 2 | 26,000 | 88 | 85 | >95 | >95 |
| 3 | 49,000 | 88 | <10 | <10 | 60 |
| 4 | 78,000 | 88 | <10 | <10 | <10 |
| 5 | 96,000 | 88 | <10 | <10 | <10 |

After the polyvinyl alcohol was dispersed, the dispersion was heated for approximately two hours at 60° C. to completely dissolve the polyvinyl alcohol. The solution was cooled to approximately 30° C. and a slurry of 5.1 g of fructose in 15 g of distilled water was added with mixing. The viscous mixture was stirred for 16 hours at 23° C. to insure complete mixing and to remove any air bubbles. It was then cast on a glass plate using a film applicator with an 0.051 cm clearance.

The resulting film was dried at room temperature for 1-2 hours, dried further at 37.5° C. for 2 hours and allowed to equilibrate to room temperature conditions (≃23° C., 50% relative humidity) before being removed from the glass plate for testing. This procedure yielded a film 0.0038 cm thick containing approximately 66% polyvinyl alcohol (number average molecular weight≃96,000, 88% hydrolyzed), 2% polyethylene glycol (number average molecular weight≃200), 26% fructose and 6% water. Using the evaluation procedure as set out above, 70% of the film dissolved in 300 seconds.

Using a similar procedure, additional films of a thickness of approximately 0.0038 cm with different polyhydroxy compounds at levels of approximately 26% by weight were prepared and evaluated. The polyvinyl alcohol used in these examples was 88% hydrolyzed and had a number average molecular weight of approximately 96,000. Table II presents the results of testing such films.

800. Thus, polyvinyl alcohol resins of as much as 200,000 number average molecular weight are expected to be rendered rapidly soluble by the correct choice of polyhydroxy compounds and its level in the film.

EXAMPLES 16-27

12.9 g of polyvinyl alcohol (number average molecular weight≃96,000, 88% hydrolyzed) was added slowly with mixing to 0.9 g of polyethylene glycol (average molecular weight≃200), 4.6 g of polyacrylic acid (average molecular weight≃5,000) and 96.6 g of deionized water. After the polyvinyl alcohol was dispersed, the dispersion was heated for approximately two hours at 60° C. to dissolve the polyvinyl alcohol. The solution was cooled at 23° C., stirred slowly to remove air bubbles and cast on a glass plate using a film applicator with an 0.051 cm clearance. The resulting film was dried at room temperature for 1-2 hours, dried further at 37.5° C. for 2 hours and allowed to equilibrate at room temperature conditions (≃23° C., 50% relative humidity) before being removed from the glass plate for testing. This procedure yielded a film 0.0038 cm thick containing approximately 66% polyvinyl alcohol, 24% polyacrylic acid, 5% polyethylene glycol and 5% water. Using the evaluation procedure as set out above, >95% of the film dissolved in 150 seconds.

Using a similar procedure additional films, approximately 0.0038 cm thick, containing other acids at levels of approximately 24% by weight were prepared and evaluated. These films contained polyvinyl alcohol, 88% hydrolyzed, and with a number average molecular weight of approximately 96,000. The results are summarized in Table III.

These examples demonstrate that acids must have $K_a$ values greater than $10^{-9}$M to provide a film that meets desired solubility criteria. Furthermore, a polyvinyl alcohol film of number average molecular weight greater than 50,000 has been shown to be rendered rapidly soluble due to the inclusion of these acidic com-

TABLE II

| | | | % film dissolved/dispersed | | |
|---|---|---|---|---|---|
| Example | Polyhydroxy Compound | $K_2$ | 30 sec. | 150 sec. | 300 sec. |
| 5 | (none) | | <10 | <10 | <10 |
| 6 | fructose | 98,500 | 25 | 50 | 70 |
| 7 | mannitol | 88,500 | 80 | 90 | 95 |
| 8 | catechol | 14,200 | 40 | 50 | 70 |
| 9 | pentaerythritol | 1,110 | 40 | 50 | 70 |
| 10 | glucose | 770 | <10 | <10 | 15 |
| 11 | arabinose | 675 | <10 | <10 | 10 |
| 12 | galactose | 298 | <10 | <10 | 10 |
| 13 | sorbitol | not known | 40 | 60 | 80 |
| 14 | sorbose | not known | 30 | 50 | 75 |
| 15 | meso-erythritol | not known | <10 | <10 | 50 |

These examples demonstrate that polyhydroxy compounds should have $K_2$ values greater than about 800M$^{-2}$ to provide a film that meets desired solubility criteria. Furthermore, a polyvinyl alcohol film of number average molecular weight greater than 50,000 has been shown to be rapidly soluble due to the inclusion of these polyhydroxy compounds having $K_2$ greater than ponents having $K_a > 10^{-9}$. Thus based on polyvinyl alcohol resins of as much as 200,000 number average molecular weight are expected to be rapidly soluble by the correct choice of acidic compound and its level in the film.

EXAMPLE 28

Using procedures similar to those described in the previous examples, a film combining two of the embodiments presented previously herein was made and evaluated. The procedure yielded a film approximately 0.0038 cm thick with a composition of approximately 81% polyvinyl alcohol (88% hydrolyzed, number average molecular weight approximately 25,000), 14% mannitol and 5% water.

TABLE III

| | | | % film dissolved/dispersed | | |
|---|---|---|---|---|---|
| Example | Acid | $K_a(M)$ | 30 sec. | 150 sec. | 300 sec. |
| 16 | polyacrylic | $10^{-5}$ | 90 | >95 | >95 |
| 17 | oxalic | $6 \times 10^{-2}, 6 \times 10^{-5}$ | <10 | 90 | >95 |
| 18 | glutamic | $7 \times 10^{-3}, 5 \times 10^{-5}$ | 30 | 40 | 80 |
| 19 | tartaric | $1 \times 10^{-3}, 5 \times 10^{-5}$ | 40 | 60 | 85 |
| 20 | citric | $8 \times 10^{-4}, 1.8 \times 10^{-5}, 4 \times 10^{-6}$ | 60 | 75 | 90 |
| 21 | succinic | $7 \times 10^{-5}, 2 \times 10^{-6}$ | 40 | 40 | 70 |
| 22 | benzoic | $6 \times 10^{-5}$ | 15 | 25 | 70 |
| 23 | adipic | $4 \times 10^{-5}$ | 60 | 70 | 95 |
| 24 | potassium hydrogen phthalate | $3 \times 10^{-6}$ | 25 | 40 | 70 |
| 25 | sodium dihydrogen phosphate | $6 \times 10^{-8}$ | 30 | 45 | 70 |
| 26 | cysteine | $7 \times 10^{-9}$ | 20 | 30 | 50 |
| 27 | sodium tartrate | $<10^{-9}$ | <10 | <10 | <10 |

This film combines the use of a polyvinyl alcohol resin with a number average molecular weight less than 50,000 and a polyhydroxy compound with a binding constant with borate that is greater than $800M^{-2}$. The film was evaluated using the procedures set forth previously and it was found that >95% of the film by volume, dissolved or dispersed, as determined by visual examination, in 30 seconds under the test conditions set forth previously. This represents an improvement over either embodiment alone (Examples 2 and 7) and although both previous examples set forth films that met solubility criteria, this example indicates that combinations of the embodiments yield films with still better solubility characteristics.

Better solubility characteristics can become important when the laundry additive combination comprising a laundry additive and an envelope made from a film as set forth herein is used in extreme or misuse conditions. For example, it is not uncommon for the consumer to use more than the recommended amount of bleaching compositions containing sodium perborate when laundering a heavily soiled load or in small volumes of washing liquor. Such would result in a concentration of borate as high as $3.4 \times 10^{-3}M$ or even higher in the laundry liquor. Also, it is not uncommon for the consumer to launder delicate items at temperatures significantly less than 37.5° C. Both conditions can have the effect of reducing the solubility rate of films that meet the criteria set forth previously herein. An additional demonstration of the advantage of combining the embodiments in one film is set forth in the next examples.

EXAMPLES 29 AND 30

Using procedures similar to those described in the previous examples, two additional films were produced at a thickness of approximately 0.0079 cm. The solubility rates of the two films were evaluated under conditions identical to those set forth previously herein with the exceptions that the borate concentration was maintained at $3.4 \times 10^{-3}M$ and that the temperature was maintained at 23° C. The results appear in Table IV.

Thus, although the film presented in Example 29, in which one of the embodiments of this invention is used (low molecular weight), has an acceptable solubility rate under the conditions set forth in this example, the solubility rate is relatively low. However, by combining the embodiments which teach the use of polyvinyl alcohol resins with number average molecular weight of about 50,000 or less, and the use of a polyhydroxy compound which has a binding constant with borate above about $800M^{-2}$, a film is produced with a solubility rate considerably higher and more acceptable than that of Example 29. Thus, the combinations of the embodiments presented herein offers significant advantages over separate use of the individual embodiments. It can be expected that combinations of any two of the particular embodiments presented herein, or combinations of all three embodiments, will yield films that readily meet solubility criteria set forth previously.

TABLE IV

| | Film Composition | | | | | |
|---|---|---|---|---|---|---|
| | % PVA 88% hydrolyzed; Number average | | % polyethylene glycol | | | % dissolved/dispersed |
| Example | MW ≈ 10,000 | % fructose | MW ≈ 200 | % H₂O | 30 sec | 300 sec |
| 29 | 75 | 0 | 19 | 6 | <10 | 60 |
| 30 | 75 | 19 | 0 | 6 | >95 | >95 |

A further demonstration of the advantages of combining a low molecular polyvinyl alcohol film and a polyhydroxy compound are set forth as follows. Surprisingly, it has been discovered that if a low molecular weight film is combined with a typical plasticizer, e.g., polyethylene glycol (a compound which has a binding constant with borate much lower than $800M^{-2}$), contacted with a detergent mixture of nonionic and anionic surfactants and builders for 14–28 days, removed, and finally placed in a borate concentration of $3.4 \times 10^{-3}M$ at a pH of about 10.7, at about 21.1° C., such film will display poor solubility. This was unexpected, since it was believed that any relatively low molecular weight film would be adequately soluble even where there is a high, localized amount of perborate. Contact with the detergent, however, apparently diminishes solubility for a low molecular weight polyvinyl alcohol film, whether it is used by itself, or in combination with a plasticizer such a glycerin or polyethylene glycol.

Surprisingly, however, addition of one of the preferred polyhydroxy compounds having a binding constant with borate of more than $800M^{-2}$ to a low molecular weight polyvinyl alcohol resulted in substantially complete solublity even at the same temperature, pH and use conditions ($3.4 \times 10^{-3}M$ borate ion concentration), after storage in the presence of the previously mentioned detergent. Further, this solubility remained constant even after the film was aged, respectively, 14 and 28 days. This shows that if the inventive films are used in one of their most preferred embodiments, i.e., as a pouch to deliver detergent or other laundry additive, the presence of a detergent composition such as the one used in this test will not lessen the film's solubility in borate solution to any substantialy extent. These results are disclosed below in TABLE V, Examples 31-34.

nyl alcohol, the solubility rate of said plasticized film in a laundry solution having a borate concentration of about $1.7 \times 10^{-3}M$ and a pH of about 10.7 being increased by the presence therein, in addition to a plasticizing amount of plasticizer, of a solubility rate increasing amount of a polyhydroxy compound, PHC, which has a binding constant, $K_2$, with borate, in aqueous solution at 25° C., that is greater than about $800M^{-2}$, $K_2$ being defined as equal to $$\frac{\text{(Complex)}}{\text{(borate) (PHC}^2\text{)}}$$

wherein (Complex), (borate) and (PHC) are the molar concentrations of the respective constituents; and contacting said envelope with an aqueous laundry solution containing borate at levels as high as $3.4 \times 10^{-3}M$ for a sufficient time for said envelope to dissolve sufficiently to allow said additive to contact said aqueous laundry solution.

2. A method as set forth in claim 1, wherein said polyhydroxy compound is select from the group consisting of fructose, sorbitol, mannitol, sorbose, catechol,

TABLE V

| | FILM COMPOSITION (Dry Weight Basis) | | | | | % DISSOLVED/ DISPERSED | |
|---|---|---|---|---|---|---|---|
| EXAMPLE | % PVA 88% HYDROLYZED: MW 10,000 | % FRUCTOSE | % POLYETHYLENE GLYCOL | % GLYCEROL | DAYS AGED | 30 SEC. | 300 SEC. |
| 31 | 80 | 0 | 0 | 20 | 0 | >95 | >95 |
| 32 | 80 | 0 | 0 | 20 | 14 | insol. | 10 |
| 33 | 80 | 0 | 0 | 20 | 28 | 10 | 20 |
| 34 | 70 | 10 | 20 | 0 | 0 | >95 | >95 |
| 35 | 70 | 10 | 20 | 0 | 14 | >95 | >95 |
| 36 | 70 | 10 | 20 | 0 | 28 | >95 | >95 |
| 37 | 80 | 0 | 20 | 0 | 0 | 75 | >95 |
| 38 | 80 | 0 | 20 | 0 | 14 | 15 | 50 |
| 39 | 80 | 0 | 20 | 0 | 28 | insol. | 25 |

INDUSTRIAL APPLICABILITY

The present invention is directed to and discloses both a polyvinyl alcohol film and a laundry additive-envelope combination with the film being of proper solubility rate in borate containing solutions under normal laundry conditions so as to deliver the contents of an envelope made of the film early during a wash cycle, even when borate is present.

We claim:

1. A method of introducing a laundry additive to an aqueous laundry solution containing borate at levels as high as $3.4 \times 10^{-3}M$, comprising:

enclosing said additive in a sealed water soluble envelope, said envelope being formed of a plasticized film of a polymer consisting essentially of polyvipentaerythritol and mesoerythritol.

3. A method as set forth in claim 1, wherein said compound comprises mannitol and wherein said film has a number average of molecular with of about 10,000.

4. A method as set forth in claim 1, wherein said polyhydroxy compound is sorbitol and wherein said polymer has a number average molecular weight of no more than about 25,000.

5. A method as set forth in claim 1, wherein said molecular weight is no more than about 25,000.

6. A method as set forth in claim 1, wherein said molecular weight is about 10,000.

* * * * *

UNITED STATES PATENT AND TRADEMARK OFFICE
CERTIFICATE OF CORRECTION

PATENT NO. : 4,626,372

DATED : December 2, 1986

INVENTOR(S) : Edward J. Kaufmann et al

It is certified that error appears in the above-identified patent and that said Letters Patent is hereby corrected as shown below:

Claim 3: Reads "A method as set forth in claim 1, wherein said means comprises manitol and wherein said film has a number average of molecular weight of about 10,000."

Should Read -- A method as set forth in claim 1, wherein said polyhydroxy compound comprises mannitol and wherein said film has a number average molecular weight of about 10,000.--

Claim 5: Reads "A method as set forth in claim 1, wherein said molecular weight is no more than about 25,000."

Should Read -- A method as set forth in claim 1, wherein said polymer has a number average molecular weight of no more than about 25,000.--

Claim 6: Reads "A method as set forth in claim 1, wherein said molecular weight is about 10,000."

Should read -- A method as set forth in claim 1, wherein said polymer has a number average molecular weight of about 10,000.--

Signed and Sealed this

Eighteenth Day of August, 1987

Attest:

DONALD J. QUIGG

*Attesting Officer*   *Commissioner of Patents and Trademarks*